(12) United States Patent
Nakagomi

(10) Patent No.: US 9,996,930 B2
(45) Date of Patent: Jun. 12, 2018

(54) IMAGE PROCESSING APPARATUS, IMAGE PROCESSING METHOD, AND STORAGE MEDIUM STORING A PROGRAM THAT DETERMINE A CONFORMABLE IMAGE

(71) Applicant: CANON KABUSHIKI KAISHA, Tokyo (JP)

(72) Inventor: Keita Nakagomi, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/062,409

(22) Filed: Mar. 7, 2016

(65) Prior Publication Data

US 2016/0275685 A1 Sep. 22, 2016

(30) Foreign Application Priority Data

Mar. 18, 2015 (JP) .................................. 2015-054327

(51) Int. Cl.
*G06K 9/00* (2006.01)
*G06T 7/00* (2017.01)
*G06T 7/33* (2017.01)

(52) U.S. Cl.
CPC .............. *G06T 7/0016* (2013.01); *G06T 7/33* (2017.01); *G06T 2207/10076* (2013.01); *G06T 2207/30168* (2013.01)

(58) Field of Classification Search
CPC . G06T 2207/10076; G06T 2207/10081; G06T 2207/30061; G06T 7/0012; G06T 7/277
See application file for complete search history.

(56) References Cited

U.S. PATENT DOCUMENTS

| 7,545,967 B1 * | 6/2009 | Prince ....................... G06T 5/50 128/920 |
| 8,655,040 B2 * | 2/2014 | Leung ................... G06T 7/0012 378/8 |
| 2005/0169509 A1 * | 8/2005 | Grasslin .................... G06T 5/50 382/130 |

(Continued)

FOREIGN PATENT DOCUMENTS

JP 2005-323994 A 11/2005

*Primary Examiner* — Bhavesh Mehta
*Assistant Examiner* — Ian Lemieux
(74) *Attorney, Agent, or Firm* — Fitzpatrick, Cella, Harper & Scinto

(57) ABSTRACT

An image processing apparatus includes an image obtaining unit to obtain a time-sequential image obtained in order of a start image, a plurality of intermediate images, and an end image. A route determining unit determines a route passing from the start to the end image via at least one of the plurality of intermediate images for the time-sequential image. An image selecting unit selects a plurality of first selection images from among the plurality of intermediate images. A conformity calculating unit calculates a first conformity based on image quality of the first selection image and a similarity between the start image and the first selection image, for each of the plurality of first selection images. A conformable image determining unit determines a first conformable image from among the plurality of first selection images on the basis of the first conformity corresponding to each of the plurality of first section images.

18 Claims, 10 Drawing Sheets

(56) References Cited

U.S. PATENT DOCUMENTS

2008/0009683 A1* 1/2008 Bogoni .................. A61B 5/085
  600/300
2012/0045104 A1* 2/2012 Hezel .................... A61B 5/055
  382/131

* cited by examiner

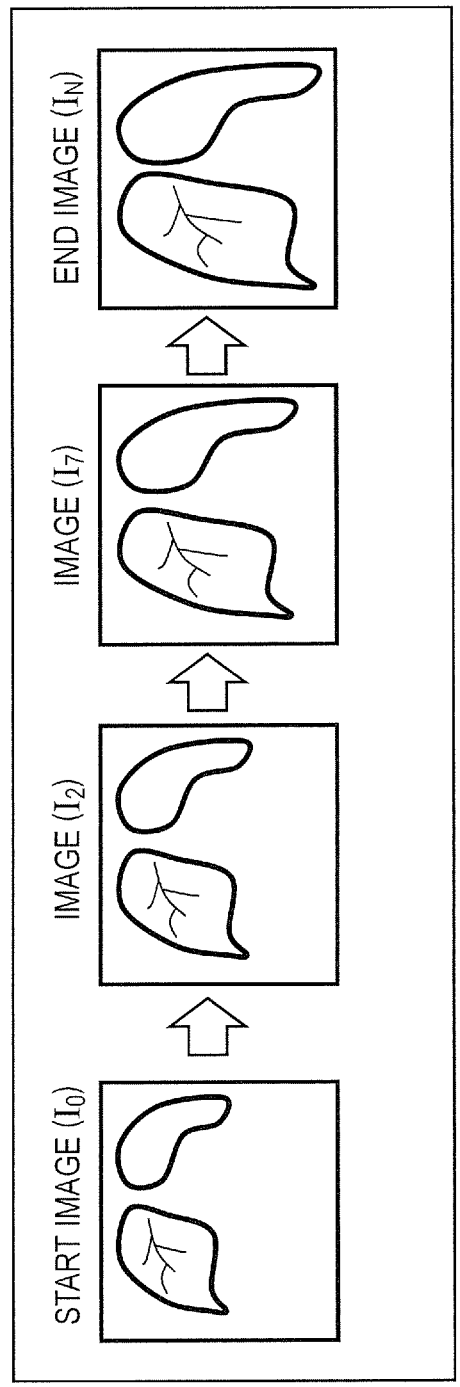

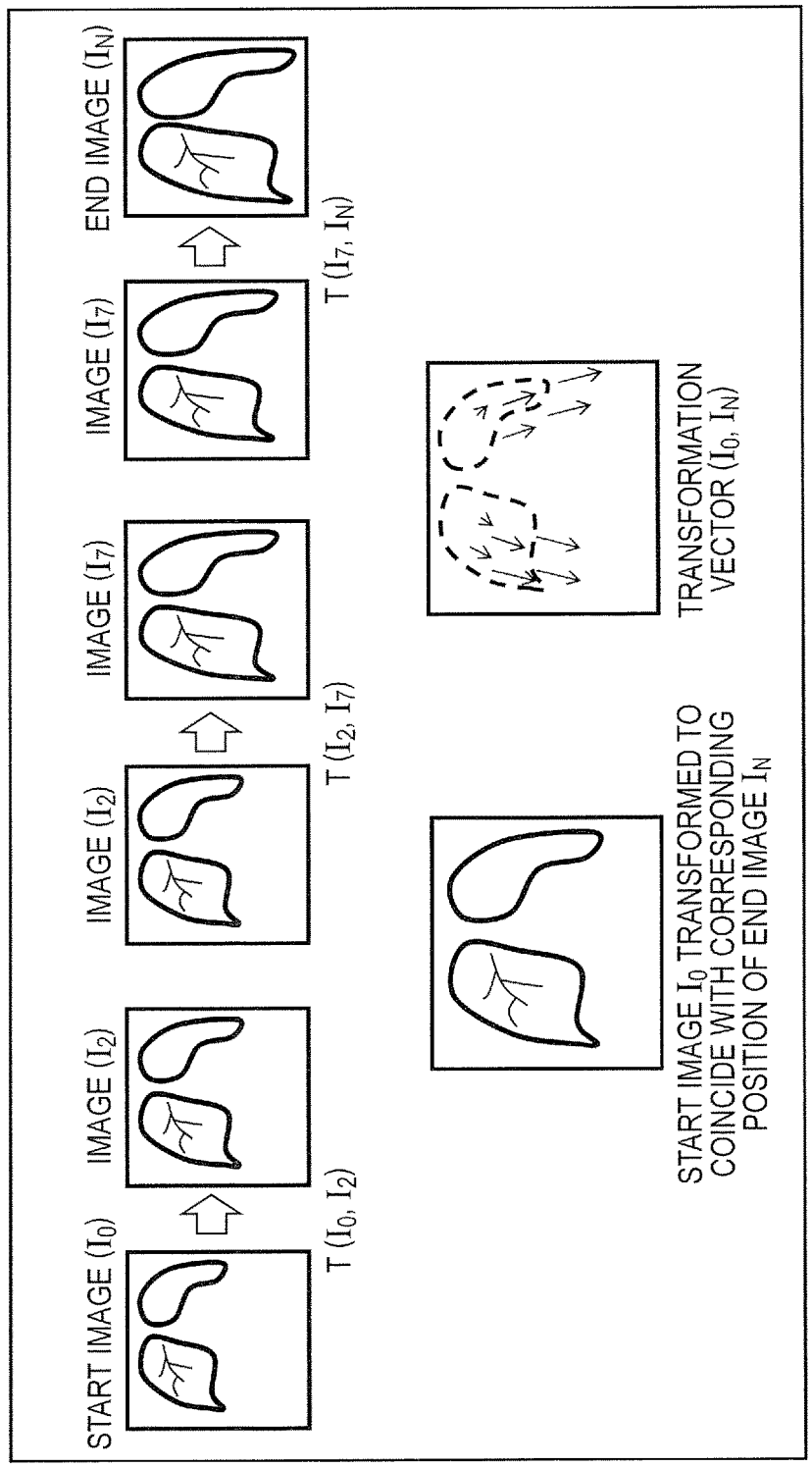

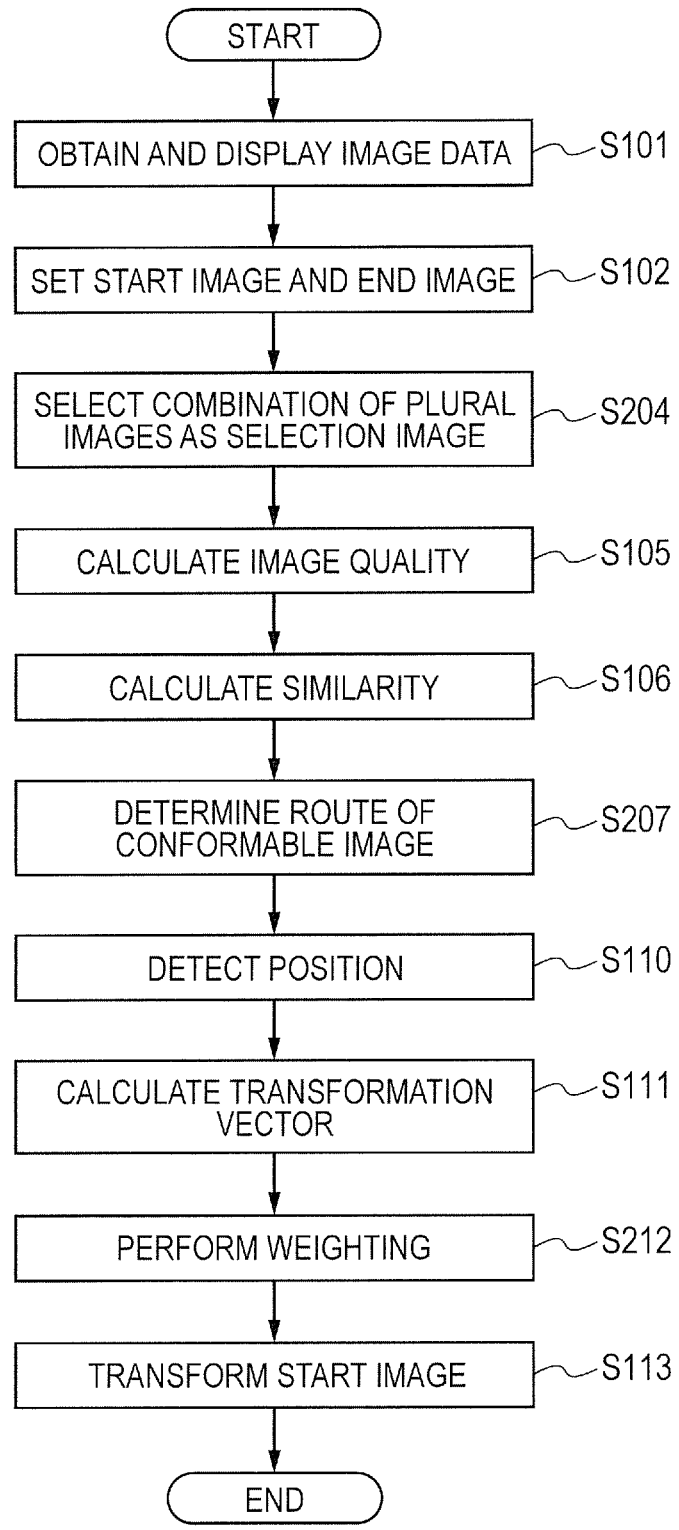

IMAGE PROCESSING APPARATUS, IMAGE PROCESSING METHOD, AND STORAGE MEDIUM STORING A PROGRAM THAT DETERMINE A CONFORMABLE IMAGE

CLAIM OF PRIORITY

This application claims the benefit of Japanese Patent Application No. 2015-054327, filed Mar. 18, 2015, which is hereby incorporated by reference herein in its entirety.

BACKGROUND OF THE INVENTION

Field of the Invention

The present invention relates to an image processing apparatus and, more particularly, to an image processing apparatus for time-sequentially obtaining a plurality of medical images, an image processing method, and a storage medium for storing a program for causing the image processing apparatus to operate.

Description of the Related Art

As medical image imaging apparatuses (modalities) for imaging a medical image, there are an X-ray computed tomography apparatus (X-ray CT), a nuclear magnetic resonance imaging apparatus (MRI), an ultrasonic image diagnosing apparatus (US), and the like.

The medical image imaging apparatus can obtain tomographic images of an object to be examined (for example, a human body) by a plurality of time phases and generate a moving image by medical images that were time-sequentially obtained. Thus, a motion of an organ is observed and a normal region and an abnormal region of the organ can be discriminated. The organs that are observed by using moving images are mainly lungs that work by respiration, a heart that works by a heartbeat, and the like. For example, an adhesion between a lung surface and a chest can be known from a result of a motion analysis of the lungs before a surgical operation. A structural fluid analysis of a blood vessel is performed from the moving image of the heart, and a stricture of the blood vessel of the heart can be known from a result of the structural fluid analysis.

In order to correctly perform those analyses, in images within a range from a predetermined time phase to another time phase among images constructing the moving image, it is necessary to accurately detect a position of an observation target. However, in the case of imaging a moving image of movement of a human body, images (still images) constructing the moving image are not always suitable for an image process.

For example, when a motion of an organ is higher than an imaging speed of the imaging apparatus, there is a case in which noises, called "motion artifacts", are included in the image. In such a case, since such an image that an outline of the blood vessel or organ is seen as a double image is obtained, image quality deteriorates, it is difficult to specify corresponding positions among the images, and a detecting precision of the position of the organ (outline of the organ or blood vessel) deteriorates.

To solve such a problem, a method of detecting a position of an observation target (organ) by using images at a motion start time point and a motion end time point, when a motion of the observation target is slow, is used. However, when a transformation amount of the observation target is large between the images, a detecting precision of the position of the observation target deteriorates. Therefore, when an absolute value of the motion of the observation target (organ) is large, it is difficult to detect the position of the observation target from the images at the motion start time point and the motion end time point, and the position detecting precision deteriorates. Therefore, in order to maintain the high position detecting precision even when a change amount of the observation target is large, a method of using the images between the motion start time point and the motion end time point is necessary.

The Official Gazette of Japanese Patent Application Laid-Open No. 2005-323994 discloses a method whereby among a plurality of images that were time-sequentially obtained, a positional deviation is corrected between the adjacent images, and such a correcting process is repeated until a position matching is finished.

However, according to the method disclosed in the Official Gazette of Japanese Patent Application Laid-Open No. 2005-323994, nothing is considered about an influence of a low image quality in the correction of the positional deviation. Therefore, if the image quality of the selected image for the positional deviation correction deteriorates, the position detecting precision deteriorates, and its influence is exerted until the end of the position matching.

The invention is made in consideration of the foregoing problem, and it is an aspect of the invention that, among a plurality of images that were time-sequentially obtained, conformities of the images are calculated, and a position of an observation target is detected by using the image having a predetermined conformity, thereby improving a position detecting precision.

SUMMARY OF THE INVENTION

According to one aspect, the invention provides an image processing apparatus comprising a start/end image setting unit configured to set a start image and an end image among a plurality of images that were time-sequentially obtained, an image selecting unit configured to select a plurality of images, as selection images, among the images within a range from the start image and the end image, a conformity calculating unit configured to calculate, as a conformity, at least one of image qualities of the selection images and similarities among the selection images, a conformable image determining unit configured to determine, as a conformable image, the selection image having the predetermined conformity, and a detecting unit configured to detect corresponding positions in the start image and the conformable image, and to detect corresponding positions in the conformable image and the end image.

According to the aspect of the invention, by detecting the position by using the image having the predetermined conformity, a position detecting precision can be improved.

Further features of the present invention will become apparent from the following description of exemplary embodiments with reference to the attached drawings.

BRIEF DESCRIPTION OF THE DRAWINGS

FIG. 6 is a diagram illustrating an example of conformable images that are input to a detecting unit.

FIG. 7 is a diagram illustrating an example of a combination of conformable images, a transformed start image, and a transformation vector.

FIG. 8 is a flowchart illustrating an example of the operation of a second modification.

DESCRIPTION OF THE EMBODIMENTS

Preferred embodiments of the present invention will now be described in detail below in accordance with the accompanying drawings. However, the invention is not limited to the following embodiments.

Figure 1:
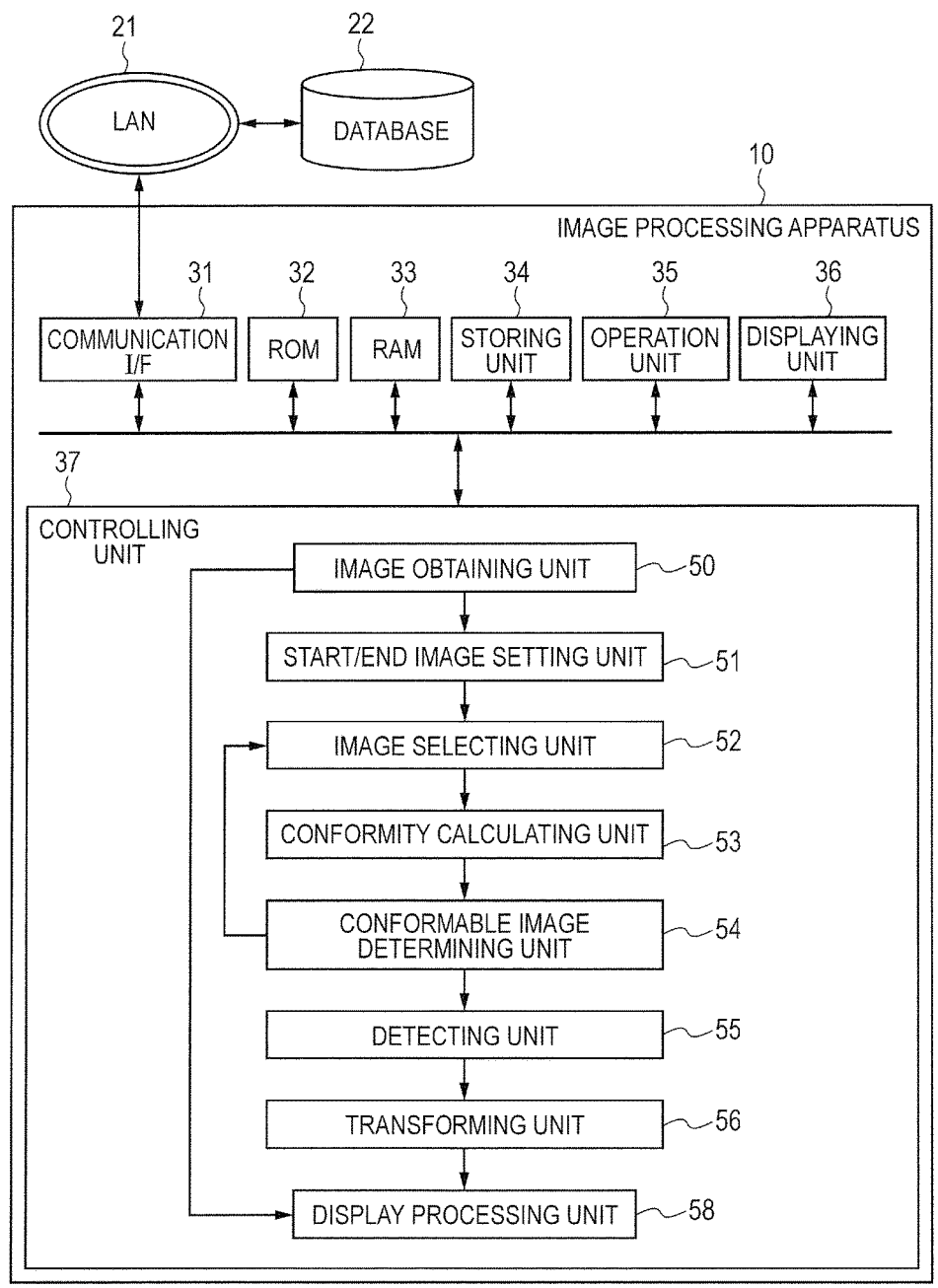
FIG. 1 is a block diagram illustrating an example of a medical image processing system including an image processing apparatus of an embodiment.

FIG. 1 is a block diagram illustrating an example of a medical image processing system including an image processing apparatus of the embodiment. As a functional construction, the medical image processing system has an image processing apparatus 10, a network 21, and a database 22. The image processing apparatus 10 is connected to the database 22 through the network 21 so that it can communicate with the database 22. For example, the network 21 is a LAN (Local Area Network).

The database 22 holds and manages medical images and information associated therewith. The image processing apparatus 10 obtains the medical images from the database 22 through the network 21. The image processing apparatus 10 has a communication I/F (interface) 31, a ROM (Read Only Memory) 32, a RAM (Random Access Memory) 33, a storing unit 34, an operation unit 35, a displaying unit 36, and a controlling unit 37.

The communication I/F 31 is constructed by a LAN card, or the like, and realizes communication between an external apparatus (for example, database 22, or the like) and the image processing apparatus 10. The ROM 32 is constructed by a non-volatile memory, or the like, and stores various kinds of programs. The RAM 33 is constructed by a volatile memory, or the like, and temporarily stores various kinds of information as data. The storing unit 34 is constructed by an HDD (Hard Disk Drive), or the like, and stores various kinds of information as data. The operation unit 35 is constructed by a keyboard, a mouse, or the like, and inputs instructions from the user (for example, a doctor) into various kinds of apparatuses.

The displaying unit 36 is constructed by a display, or the like, and displays various kinds of information to the user. The controlling unit 37 is constructed by a CPU, or the like, and unitedly controls processes in the image processing apparatus 10.

As a functional construction, the controlling unit 37 has an image obtaining unit 50, a start/end image setting unit 51, an image selecting unit 52, a conformity calculating unit 53, a conformable image determining unit 54, a detecting unit 55, a transforming unit 56, and a display processing unit 58.

From the database 22, the image obtaining unit 50 obtains a plurality of images $I_0, I_1, \ldots,$ and $I_N$ that were time-sequentially obtained. The images are medical images of an object to be examined that were obtained by various kinds of modalities. In the embodiment, the medical images are X-ray CT (Computed Tomography) images that were time-sequentially and continuously imaged.

The start/end image setting unit 51 sets a start image $I_S$ and an end image $I_E$ among the plurality of images $I_0, I_1, \ldots,$ and $I_N$ that were time-sequentially obtained. In this instance, the start image $I_S$ is an image $I_0$ and the end image $I_E$ is an image $I_N$. Image qualities of the images $I_0, I_1, \ldots,$ and $I_N$ may be calculated by a conformity calculating unit 53, which will be described hereafter, prior to setting of the start/end image setting unit 51. When the image quality of the start image $I_0$ (or, end image $I_N$) does not satisfy a predetermined image quality, the start/end image setting unit 51 may set the image of a time phase closest to a time phase of the start image $I_0$ (or, end image $I_N$), that is, the image that satisfies the predetermined image quality into the start image $I_S$ (or, end image $I_E$).

The image selecting unit 52 selects a plurality of images, as selection images, among the images $I_0, I_1, \ldots,$ and $I_N$ within a range from the start image $I_0$ to the end image $I_N$. For example, the image selecting unit 52 selects the start image I0 and another image $I_n$ as selection images. The image selecting unit 52 may also select a combination of a plurality of images, as selection images, from the images $I_0, I_1, \ldots,$ and $I_N$ within a range from the start image $I_0$ to the end image $I_N$.

The conformity calculating unit 53 calculates, as a conformity, at least one of the image qualities of the selection images and similarities among the selection images. For example, the conformity calculating unit 53 calculates the image quality of the image In as a conformity. The conformity calculating unit 53 calculates a similarity between the start image $I_0$ and the image $I_n$ as a conformity. The conformity calculating unit 53 may calculate a conformity of a part (area to which an attention is paid) of the selection images.

The conformity calculating unit 53 calculates the image quality on the basis of image quality characteristics of at least one of a sharpness degree, contrast, blurring degree, resolution, noises, and an artifact. The conformity calculating unit 53 calculates a similarity on the basis of at least one of a pixel value in each pixel of the selection image and a feature portion in the selection image.

The conformity calculating unit 53 calculates a difference, as a conformity, between times (time phases) when a plurality of selection images have been obtained. For example, the conformity calculating unit 53 calculates a time difference $(T=T_n-T_0)$, as a conformity, between a time phase $T_0$ of the start image $I_0$ and a time phase $T_n$ of the image $I_n$. The conformity calculating unit 53 calculates a conformity corresponding to the time difference T. The conformity calculating unit 53 calculates the conformity (for example, a reciprocal 1/T of the time difference T, or the like) in such a manner that the greater the time difference T is, the lesser the conformity is.

The conformable image determining unit 54 determines the selection image having a predetermined conformity as a conformable image. When the image $I_n$ has the predetermined conformity, the conformable image determining unit 54 determines the image In as a conformable image. For example, the image having the maximum conformity is determined to be a conformable image. A reference conformity serving as a reference to determine the conformable image may be set.

If the image In as a conformable image is not the end image $I_N$ (or, image $I_{N-1}$ that is precedent to the end image $I_N$ by one time phase), the image selecting unit 52 selects the second image (image $I_{n+a}$), as a selection image, among the images within a range from the first image (image $I_n$) to the end image $I_N$ on the assumption that the conformable image $I_n$ is the first image. The second image (image $I_{n+a}$) is an image obtained after the first image (image $I_n$). The conformity calculating unit 53 calculates an image quality of the second image (image $I_{n+a}$) as a conformity. The conformity calculating unit 53 calculates a similarity between the first image (image $I_n$) and the second image (image $I_{n+a}$) as a conformity.

The conformity calculating unit 53 may calculate a time difference ($T=T_{n+a}-T_n$), as a conformity, between the time phase $T_n$ of the first image (image $I_n$) and a time phase $T_{n+a}$ of the second image (image $I_{n+a}$). When the second image (image $I_{n+a}$) has a predetermined conformity (for example, maximum conformity), the conformable image determining unit 54 determines the second image (image $I_{n+a}$) as a conformable image. In this case, the first image (image In) and the second image (image $I_{n+a}$) are determined to be conformable images.

When the end image $I_N$ (or, image $I_{N-1}$) is included in the conformable images, the conformable image determining unit 54 outputs the conformable images to the detecting unit 55 (or, RAM 33). For example, when the second image (image $I_{n+a}$) as a conformable image is the end image $I_N$, the conformable image determining unit 54 outputs the conformable images (images In and $I_{n+a}$) to the detecting unit 55.

The detecting unit 55 detects corresponding positions in the start image $I_0$ and the conformable image, and detects corresponding positions in the conformable image and the end image $I_N$. Thus, the detecting unit 55 detects corresponding positions in the start image $I_0$ and the end image $I_N$ through the conformable images.

For example, the detecting unit 55 detects corresponding positions in the first image (image $I_n$) and the second image (image $I_{n+a}$), thereby detecting the corresponding positions in the start image $I_0$ and the end image $I_N$ through the first image (image $I_n$) and the second image (image $I_{n+a}$). The corresponding position is a position (pixel) of the corresponding object to be examined (for example, an outline of the lungs or heart) in each image. It is sufficient that the detection of the corresponding positions is realized by a method such as block matching, or the like.

On the basis of the corresponding positions in the start image $I_0$, the conformable image, and the end image $I_N$, the detecting unit 55 calculates a coordinate change (transformation vector) of the corresponding position from the start image $I_0$ to the conformable image, coordinate changes among a plurality of conformable images, and a coordinate change from the conformable image to the end image $I_N$. Thus, the detecting unit 55 calculates the coordinate changes of the corresponding positions from the start image $I_0$ to the end image $I_N$.

For example, the detecting unit 55 calculates a movement amount and a moving direction, as transformation vectors, in the case when each corresponding pixel has moved from the start image $I_0$ to the first image (image $I_n$). The detecting unit 55 calculates a movement amount and a moving direction, as transformation vectors, in the case when each corresponding pixel has moved from the first image (image $I_n$) to the second image (image $I_{n+a}$).

The transforming unit 56 integrates the transformation vectors from the start image $I_0$ to the end image $I_N$, thereby transforming the start image $I_0$ in such a manner that the corresponding position in the start image $I_0$ coincides with the corresponding position in the end image $I_N$. The transforming unit 56 outputs the transformed start image $I_0$ and transformation vector information (movement amount, moving direction, and the like) to the display processing unit 58.

The display processing unit 58 displays the transformed start image $I_0$ and the transformation vector information into an image display area of the displaying unit 36. The display processing unit 58 may also display the images obtained by the image obtaining unit 50, the start image $I_0$ and the end image $I_N$ set by the start/end image setting unit 51, the selection images selected by the image selecting unit 52, the conformities calculated by the conformity calculating unit 53, and the conformable images determined by the conformable image determining unit 54 into the image display area of the displaying unit 36.

Each component element of the image processing apparatus 10 mentioned above functions in accordance with a computer program. For example, the controlling unit (CPU) 37 reads and executes the computer program stored in the ROM 32, the storing unit 34, or the like, by using the RAM 33 as a work area, so that the function of each component element is realized. A part of or all of the functions of the component elements of the image processing apparatus 10 may be realized by using a dedicated circuit. A part of the functions of the component elements of the controlling unit 37 may be realized by using cloud computing.

For example, an arithmetic operating apparatus existing in a position different from that of the image processing apparatus 10 is connected to the image processing apparatus 10 through the network 21 so that they can communicate with each other, and the image processing apparatus 10 and the arithmetic operating apparatus mutually transmit and receive data, so that the functions of the component elements of the image processing apparatus 10 or the controlling unit 37 may be realized.

Subsequently, an example of the process of the image processing apparatus 10 in FIG. 1 will be described with reference to FIGS. 2 to 7. Although a medical image (moving image) of the lungs will be described as an example in the embodiment, the embodiment can also be applied to other observation regions, such as a heart, a blood vessel, and the like.

Figure 2:
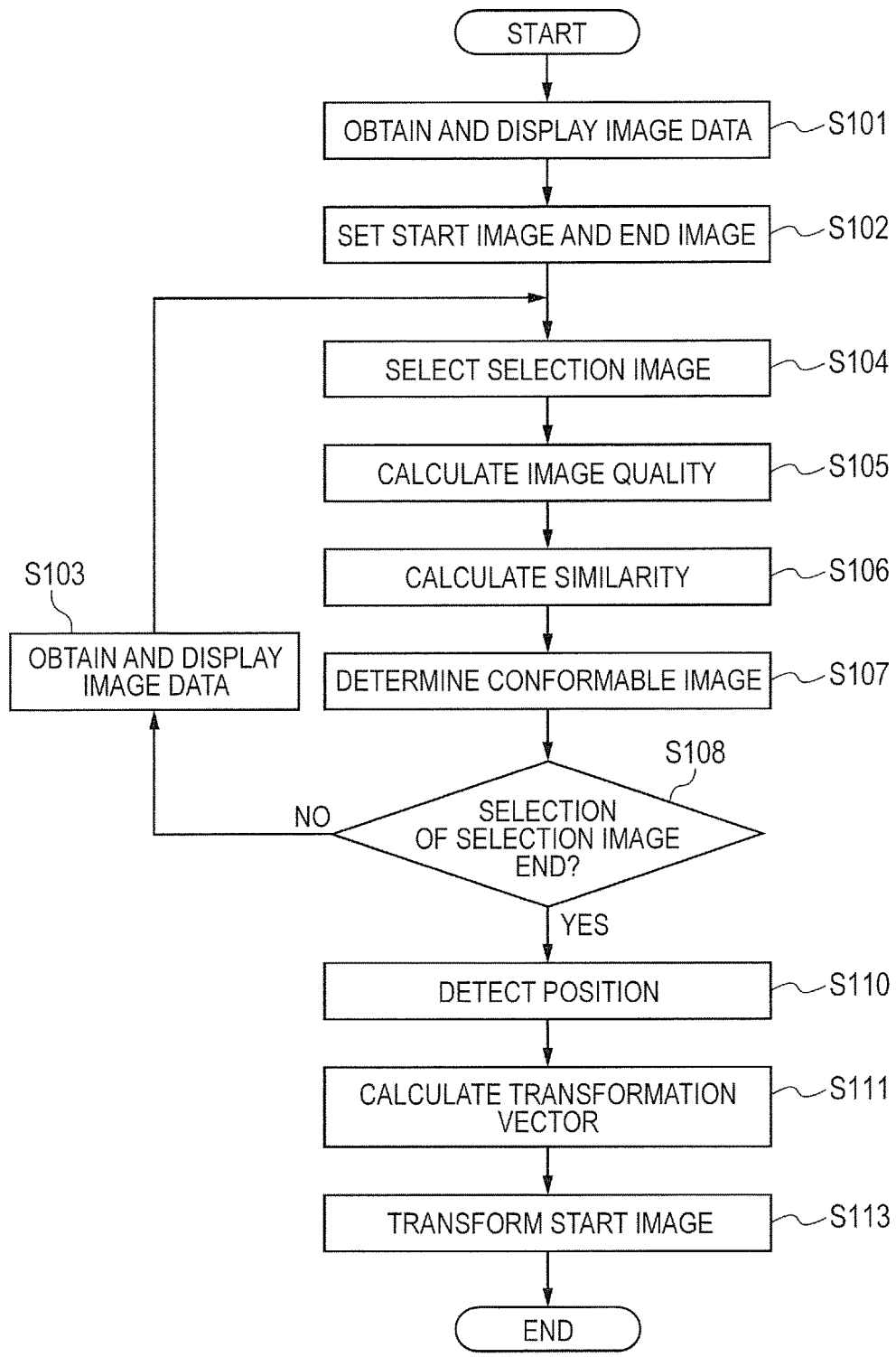
FIG. 2 is a flowchart illustrating an example of the operation of the image processing apparatus.
Figure 3:
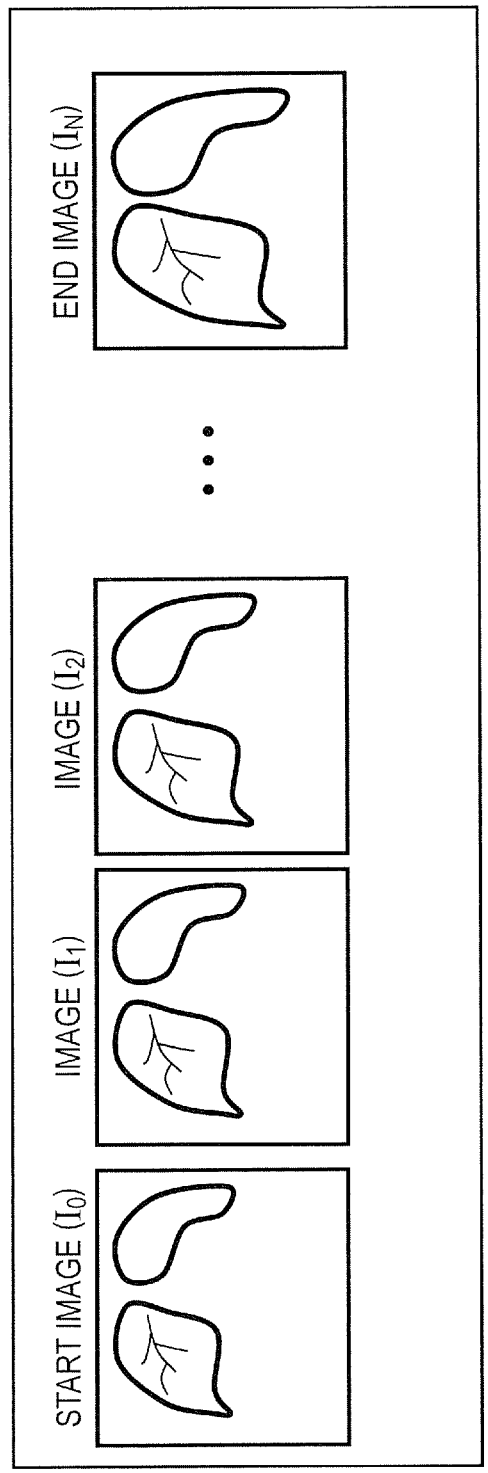
FIG. 3 is a diagram illustrating an example of image data obtained by an image obtaining unit.

FIG. 2 is a flowchart illustrating an example of the operation of the image processing apparatus 10. When the user instructs an obtainment of the moving image through the operation unit 35, in step S101, the image obtaining unit 50 obtains the moving image (image data) designated by the user from the database 22 and stores the image into the RAM 33. FIG. 3 is a diagram illustrating an example of the image data obtained by the image obtaining unit 50. As illustrated in FIG. 3, the image obtaining unit 50 obtains a plurality of images $I_0$, $I_1$, ..., and $I_N$ constructing the moving image designated by the user from the database 22. The display processing unit 58 displays the image data obtained from the database 22 into the image display area of the displaying unit 36.

In step S102, the start/end image setting unit 51 reads out the image data from the RAM 33 and sets the start image $I_S=I_0$ and the end image $I_E=I_N$ among the plurality of images $I_0, I_1, \ldots,$ and $I_N$. In step S104, the image selecting unit 52 selects a plurality of images, as selection images, among the images $I_0, I_1, \ldots,$ and $I_N$ within a range from the start image $I_0$ to the end image $I_N$.

Figure 4:
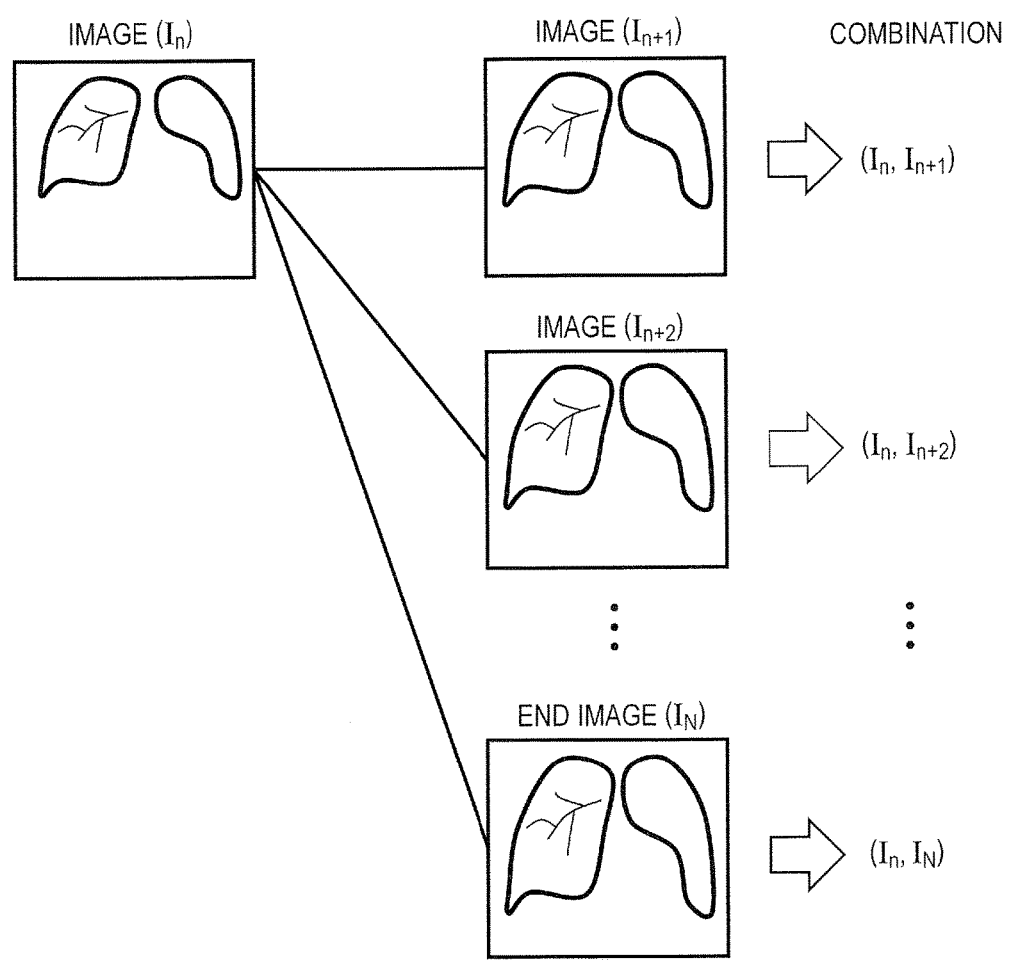
FIG. 4 is a diagram illustrating an example of a combination of two images selected by an image selecting unit.

FIG. 4 is a diagram illustrating an example of the selection images. As illustrated in FIG. 4, the image selecting unit 52 selects, as selection images, combinations $(I_n, I_{n+1})$, $(I_n, I_{n+2}), \ldots,$ and $(I_n, I_N)$, each of which is constructed by the two images including the image In and one of the images $I_{n+1}, I_{n+2}, \ldots,$ and $I_N$ obtained after the image $I_n$.

In step S105, the conformity calculating unit 53 calculates an image quality Q of the selection image as a conformity. In this instance, the conformity calculating unit 53 calculates an image quality $Q(\alpha, \beta)$ of the selection image on the basis of a sharpness degree $\alpha$ and a blurring degree $\beta$ of an anatomical structure (area to which an attention is paid, below, referred to as an attention area) in the object to be examined. The attention area is an area containing edge portions (outline, or the like, of an organ or a blood vessel) in the image (medical image). In order to extract the attention area, the conformity calculating unit 53 can use a well-known organ extracting process, such as a threshold value process, a graph cutting process, or the like.

In the embodiment, it is assumed that the pulmonary blood vessel is an attention area. In order to calculate the sharpness degree $\alpha$ of the image of the pulmonary blood vessel, an output value (filter output value) of a blood vessel emphasizing filter is used. When the blood vessel emphasizing filter is performed to the image of the blood vessel, the greater the sharpness degree $\alpha$ of the image of the blood vessel, the greater the filter output value. By using such a phenomenon, the conformity calculating unit 53 performs the blood vessel emphasizing filter to all pixels in the attention area and calculates, as a sharpness degree $\alpha$, a statistic value such as an average value, a maximum value, or the like, of the filter output value. The conformity calculating unit 53 may provide a predetermined threshold value, count the number of pixels in which the filter output value is equal to or greater than the threshold value, and calculate the number of pixels as a sharpness degree $\alpha$.

The conformity calculating unit 53 may also calculate the conformity by using a preset function. For example, the conformity calculating unit 53 calculates the conformity by using such a step function that when the average value of the filter output values is equal to or greater than a predetermined threshold value, the sharpness degree $\alpha=1$ is given, and when the average value of the filter output values is less than the predetermined threshold value, the sharpness degree $\alpha=0$ is given.

The conformity calculating unit 53 calculates the sharpness degree $\alpha$ of the attention area with respect to the image included in the selection images. The greater the sharpness degree $\alpha$, it is evaluated that the attention area is clear and the image quality (conformity) is high. The lesser the sharpness degree $\alpha$, it is evaluated that the attention area is unclear and the image quality (conformity) is low. The conformity calculating unit 53 may normalize the sharpness degree $\alpha$ into a predetermined range (for example, [0, 1]) on the basis of the minimum value and the maximum value of the sharpness degrees $\alpha$ of the selection images. The conformity calculating unit 53 may sort the selection images in order from the high value of the sharpness degree $\alpha$.

In order to calculate the blurring degree $\beta$ of the image of the pulmonary blood vessel, an intensity value of the pulmonary blood vessel (edge portion) is used. In the case of the image of the lungs, there is a case when an image, in which an outline of the pulmonary blood vessel, heart, or diaphragm is blurred as a double image, is obtained. As for the intensity value of the outline in which such a blurring has occurred, a tendency that such an intensity value is distributed in a range between the intensity value of the outline and the intensity value of its peripheral portion is stronger than that in the case of the intensity value of the outline in which the blurring degree is small.

In the case of a non-contrast CT image, it is known that a CT value (HU: Hounsfield Unit) corresponding to the intensity value is equal to about −900 HU in the pulmonary field and is equal to about 30 to 60 HU in the pulmonary blood vessel. By using such a fact, the conformity calculating unit 53 calculates the number of pixels in the attention area distributed to a predetermined range (for example, [−600, −200] HU) set between the CT value of the pulmonary field and the CT value of the pulmonary blood vessel, and calculates the number of pixels as a blurring degree $\beta$.

Since there is a case when a blurring of the image is caused by a vital motion at the time of imaging, the conformity calculating unit 53 may calculate vital motion information, as a blurring degree, from a measuring unit (for example, camera, sensor, or the like) for measuring a motion of a chest region and a vital motion such as breathing, heartbeat, or the like.

The conformity calculating unit 53 may calculate a conformity by using a preset function. For example, the conformity calculating unit 53 calculates the conformity by using such a step function that when the counted number of pixels is equal to or greater than a predetermined threshold value, a blurring degree $\beta=1$ is given, and when the counted number of pixels is less than the predetermined threshold value, a blurring degree $\beta=0$ is given.

The conformity calculating unit 53 calculates the blurring degree $\beta$ of the attention area with respect to the image included in the selection images. The greater the blurring degree $\beta$, it is evaluated that the attention area is unclear and the image quality (conformity) is low. The lesser the blurring degree $\beta$, it is evaluated that the attention area is clear and the image quality (conformity) is high. The conformity calculating unit 53 may normalize the blurring degree $\beta$ into a predetermined range (for example, [0, 1]) on the basis of the minimum value and the maximum value of the blurring degrees $\beta$ of the selection images. The conformity calculating unit 53 may sort the selection images in order from the high value of the blurring degree $\beta$.

In step S105, the conformity calculating unit 53 calculates the image quality $Q(\alpha, \beta)$ of the selection image on the basis of the sharpness degree $\alpha$ and the blurring degree $\beta$ of the attention area. The image quality $Q(\alpha, \beta)$ is defined in such a manner that the higher the image quality, the higher the image quality $Q(\alpha, \beta)$. For example, the image quality $Q(\alpha, \beta)$ is defined by a sum of $\alpha$ and $(1-\beta)$. The image quality $Q(\alpha, \beta)$ may be defined by a product of $\alpha$ and $(1-\beta)$. In the embodiment, the sharpness degree $\alpha$ and the blurring degree $\beta$ have been normalized into the range of [0, 1].

Since the calculation of the image quality can be processed in parallel for every image, a high processing speed is realized by parallel processes.

In step S106, the conformity calculating unit 53 calculates a similarity S between the selection images as a conformity. The similarity S is information showing a degree of coincidence between two images. For example, the conformity calculating unit 53 calculates the similarity S on the basis of a pixel value in each pixel of the image. The similarity S is a sum (L1 norm) of the absolute values of differences of the pixel values (for example, intensity values, or the like) in the respective pixels of the two images, a sum (L2 norm) of the squares of such differences, or the like.

The higher the coincidence between the two images, the lesser the sum of the absolute values of the differences or the sum of the squares of the differences. By using such a fact, the conformity calculating unit 53 calculates, as a conformity, a reciprocal of the sum of the absolute values of the differences or a reciprocal of the sum of the squares of the differences.

The conformity calculating unit 53 may calculate the similarity S on the basis of feature portions in the two images. For example, in the case of an image of the lungs, by using branch points of a trachea, a pulmonary blood vessel, and the like, as feature portions (landmarks), the conformity calculating unit 53 detects the positions of a plurality of feature portions in the image by a well-known method, and calculates the similarity S by a community of the positions or distances of the plurality of feature portions. In the case of an image of the heart, it is sufficient that a tip of a left ventricle region of the heart, a mitral valve, an aortic valve, and the like, are used as feature portions (landmarks).

The conformity calculating unit 53 calculates the similarity S with respect to the image included in the selection images. The greater the similarity S, it is evaluated that the conformity is high. The conformity calculating unit 53 may normalize the similarity S into a predetermined range (for example, [0, 1]) on the basis of the minimum value and the maximum value of the similarities S of the selection images. The conformity calculating unit 53 may sort the selection images in order from the high value of the similarity S.

When the image quality Q of the image is equal to zero or is less than a predetermined threshold value, the conformity calculating unit 53 may output nonconformity information of the image to the conformable image determining unit 54 without calculating the similarity S. By omitting the calculating process of the similarity S, a high processing speed is realized.

In the embodiment, the conformity calculating unit 53 calculates a conformity A on the basis of the image quality Q and the similarity S. Generally, in order to improve the position detecting precision among a plurality of images, it is desirable that the image quality Q is high and the similarity S is high. Therefore, as shown by the following equation (1), the conformity calculating unit 53 in the embodiment defines the conformity A by a product of the image quality $Q(\alpha, \beta)$ and the similarity S.

$$A = Q(\alpha, \beta) \times S \quad (1)$$

The conformity calculating unit 53 may define the conformity A by the sum of the image quality $Q(\alpha, \beta)$ and the similarity S or by another function of the image quality $Q(\alpha, \beta)$ and the similarity S.

When the time difference T increases, a change amount of the observation target also increases, and there is a case when the position detecting precision deteriorates. Therefore, the conformity calculating unit 53 may use a difference (time difference T) of times (time phases) when a plurality of selection images have been obtained for the purpose of calculation of the conformity A. The conformity calculating unit 53 may calculate the conformity by using a preset function. For example, the conformity calculating unit 53 may calculate the conformity A by multiplying the conformity calculated on the basis of the image quality Q and the similarity S by 1/T. The conformity calculating unit 53 may calculate the conformity A by using such a function that when the time difference T is equal to or greater than a predetermined threshold value (for example, is equal to or longer than one second or five time phases), the conformity A is reduced or is set to zero.

The conformity calculating unit 53 calculates the conformity A with respect to the image included in the selection images. The higher the conformity A, it is evaluated that the image is an image having the high position detecting precision.

In step S107, the conformable image determining unit 54 determines the selection image having a predetermined conformity as a conformable image. For example, when the conformity A of a combination $(I_n, I_{n+a})$ of the image In and the image $I_{n+a}$ is maximum, the conformable image determining unit 54 determines the combination $(I_n, I_{n+a})$ as conformable images. When the conformity A has the same value, a combination in which the time difference T is minimum is determined as conformable images. The combination of the determined conformable images (images $I_n$, $I_{n+a}$) is temporarily stored in the RAM 33.

Figure 5B:
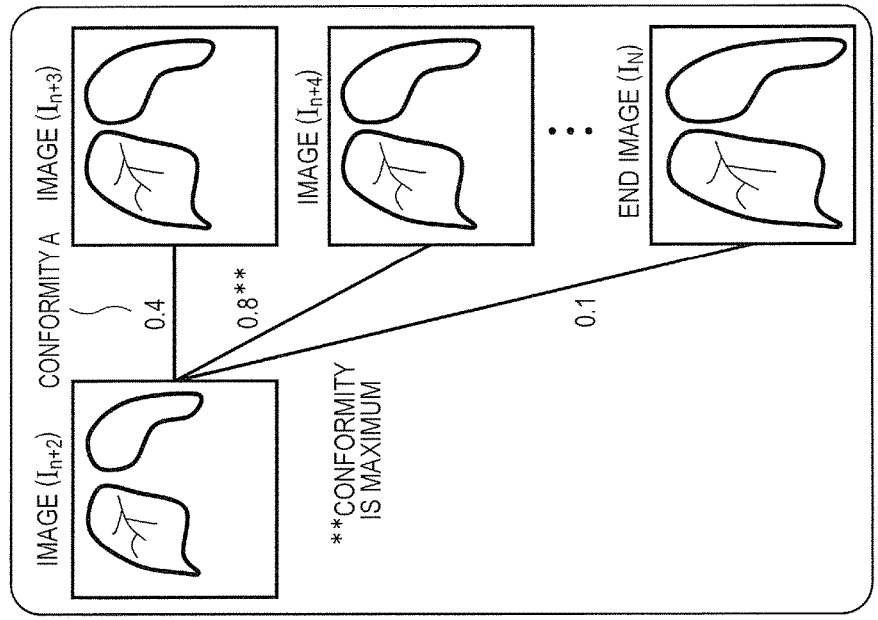
FIGS. 5A and 5B are diagrams illustrating examples of conformable images determined by a conformable image determining unit.
Figure 5A:
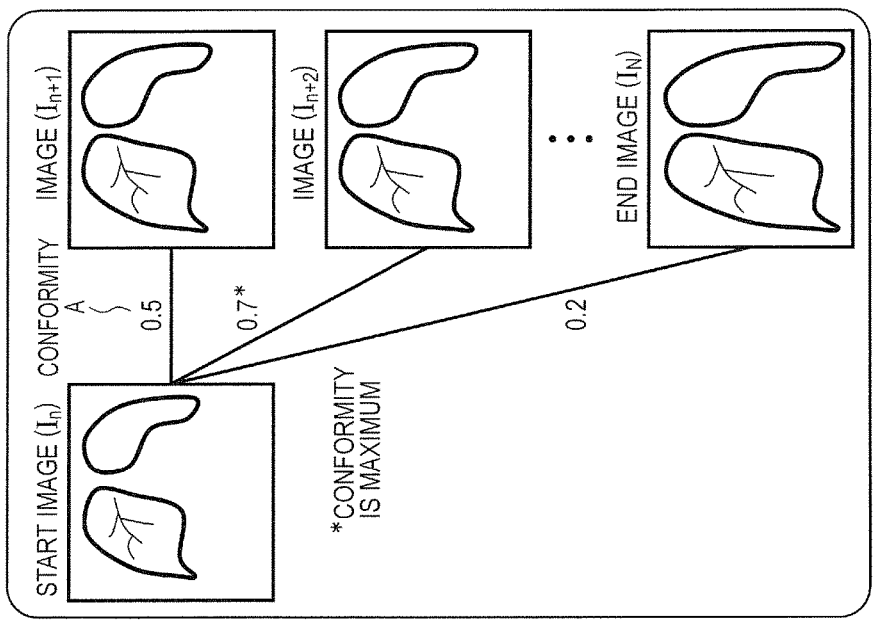

FIGS. 5A and 5B are diagrams illustrating an example of the conformity A. As illustrated in FIG. 5A, the conformable image determining unit 54 determines a combination $(I_n, I_{n+2})$, as conformable images, in which the conformity A is maximum among the selection images $(I_n, I_{n+1})$, $(I_n, I_{n+2})$, . . . , and $(I_n, I_N)$.

In step S108, the image selecting unit 52 discriminates whether or not the selection of the selection images has finished. If the end image $I_N$ or the image $I_{N-1}$ is included in the conformable images, the image selecting unit 52 finishes the selection of the selection images and advances to S110. For example, when the image $I_{n+a}$ as a conformable image is the end image $I_N$, the image selecting unit 52 determines that the selection of the selection images has finished.

In step S108, if the end image $I_N$ or the image $I_{N-1}$ is not included in the conformable images, the image selecting unit 52 determines that the selection of the selection images is not finished. In this case, in step S103, the image obtaining unit 50 obtains, from the database 22, the images $I_{n+a}$, $I_{n+a+1}$, . . . , and $I_N$ within a range from the conformable image $(I_{n+a})$ to the end image $I_N$ and returns to step S104.

When the processing routine returns to step S104, the image $I_{n+a}$ is a conformable image. Therefore, the image selecting unit 52 selects the second image (image $I_{n+b}$), as a selection image, among the images within a range from the first image (image $I_{n+a}$) to the end image $I_N$ by using the conformable image $I_{n+a}$ as a first image. The second image (image $I_{n+b}$) is an image obtained after the first image (image $I_{n+a}$). The conformity calculating unit 53 calculates, as a conformity, the image quality of the second image (image $I_{n+b}$) (step S105). The conformity calculating unit 53 also calculates, as a conformity, the similarity between the first image (image $I_{n+a}$) and the second image (image $I_{n+b}$) (step S106).

The conformity calculating unit 53 may calculate, as a conformity, a time difference $(T=T_{n+b}-T_{n+a})$ between the time phase $T_{n+a}$ of the first image (image $I_{n+a}$) and the time phase $T_{n+b}$ of the second image (image $I_{n+b}$).

When the second image (image $I_{n+b}$) has a predetermined conformity, the conformable image determining unit 54 determines the second image (image $I_{n+b}$) as a conformable image (step S107). For example, when the conformity A of a combination $(I_{n+a}, I_{n+b})$ of the image $I_{n+a}$ and the image $I_{n+b}$ is maximum, the conformable image determining unit 54 determines the combination $(I_{n+a}, I_{n+b})$ as conformable images. When the conformity A has the same value, a combination, in which the time difference T is minimum, is determined as conformable images. The determined conformable images (images $I_{n+a}$, $I_{n+b}$) are temporarily stored in the RAM 33.

For example, since the image $I_{n+2}$ in FIG. 5A is the conformable image, as illustrated in FIG. 5B, the conformable image determining unit 54 determines, as conformable images, a combination ($I_{n+2}$, $I_{n+4}$) in which the conformity A is minimum among the selection images ($I_{n+2}$, $I_{n+3}$), ($I_{n+2}$, $I_{n+4}$), . . . , and ($I_{n+2}$, $I_N$).

The processes in steps S103 to S107 are repeated until the selection of the selection images is finished in step S108, and the conformable images are determined by the conformable image determining unit 54. If it is determined in step S108 that the selection of the selection images has finished, the detecting unit 55 detects the corresponding positions in the start image $I_0$ and the conformable image and detects the corresponding positions in the conformable image and the end image $I_N$ (step S110).

FIG. 6 is a diagram illustrating an example of the conformable images that are input to the detecting unit 55. In FIG. 6, the conformable images are combinations ($I_0$, $I_2$), ($I_2$, $I_7$), and ($I_7$, $I_N$). In this case, the detecting unit 55 detects the corresponding positions in the start image $I_0$ and the conformable image (image $I_2$), detects the corresponding positions among a plurality of conformable images (images $I_2$, $I_7$), and detects the corresponding positions in the start image $I_0$ and the end image $I_N$. In this manner, among the plurality of images that were time-sequentially obtained, by calculating the conformities of the images and detecting the corresponding positions by using the conformable images having a predetermined conformity, the position detecting precision can be improved.

In step S111, the detecting unit 55 calculates a transformation vector of the corresponding position from the start image $I_0$ to the conformable image (image $I_2$), transformation vectors among a plurality of conformable images (images $I_2$, $I_7$), and a transformation vector from the conformable image (image $I_7$) to the end image $I_N$. In step S113, the transforming unit 56 integrates the transformation vectors from the start image $I_0$ to the end image $I_N$, thereby transforming the start image $I_0$ so that the corresponding position in the start image $I_0$ coincides with the corresponding position in the end image $I_N$.

In the embodiment, the detecting unit 55 calculates transformation vectors while time-sequentially tracing the start image I0, the conformable images, and the end image $I_N$. For example, the detecting unit 55 uses an image $I_r$ as a reference image, uses an image $I_{r-a}$ obtained by time-sequentially tracing the image $I_r$ as a floating image, and calculates transformation vectors. According to such a process, the transforming unit 56 transforms the image $I_{r-a}$ on the basis of the transformation vector of the corresponding position from the image $I_{r-a}$ whose time phase is precedent to that of the image $I_r$ to the image $I_r$, thereby enabling the corresponding position of the floating image to coincide with the corresponding position of the reference image.

In this instance, the transformation vector is a vector showing a movement amount and a moving direction in the case when each pixel of the floating image corresponding to each pixel of the reference image has been moved from the floating image to the reference image. For example, in a three-dimensional image, when coordinates (x, y, z) of each pixel of the floating image are moved to coordinates (X, Y, Z) of each pixel of the reference image, a transformation vector is (X-x, Y-y, Z-z).

In the embodiment, since the transformation vectors are calculated in parallel for every combination of the conformable images, a high processing speed is realized by the parallel processes.

The transformation of the image may be executed by a linear position matching method as in an affine transformation or a non-linear position matching method as in an FFD (Free Form Deformation), or may be executed by a combination of them. A plurality of images that were time-sequentially obtained may be the output image of the emphasizing filter in S105, the area image of the attention area, and a combination of those images besides the original images obtained by various kinds of modalities, and those images may be transformed.

The integration of the transformation vectors in step S113 is performed by using all of the transformation vectors calculated in step S111. By integrating the transformation vectors from the start image $I_0$ to the end image $I_N$, a transformation vector $T(I_0, I_N)$ from the start image $I_0$ to the end image $I_N$ is calculated.

As illustrated in FIG. 7, in step S111, transformation vectors $T(I_0, I_2)$, $T(I_2, I_7)$, and $T(I_7, I_N)$ are calculated with respect to the respective combinations ($I_0$, $I_2$), ($I_2$, $I_7$), and ($I_7$, $I_N$) of the conformable images.

The transformation vector $T(I_7, I_N)$ is calculated from a coordinate change of each pixel of the floating image I7 corresponding to each pixel of the reference image $I_N$. The transformation vector $T(I_2, I_7)$ is calculated from a coordinate change of each pixel of the floating image $I_2$ corresponding to each pixel of the reference image $I_7$. The transformation vector $T(I_0, I_2)$ is calculated from a coordinate change of each pixel of the floating image $I_0$ corresponding to each pixel of the reference image $I_2$. In this manner, the detecting unit 55 calculates the transformation vectors $T(I_7, I_N)$, $T(I_2, I_7)$, and $T(I_0, I_2)$ while time-sequentially tracing.

The detecting unit 55 calculates the transformation vector $T(I_0, I_N)$ from the start image $I_0$ to the end image $I_N$ by integrating the transformation vectors $T(I_0, I_2)$, $T(I_2, I_7)$, and $T(I_7, I_N)$. By integrating the transformation vectors calculated in step S111, the transforming unit 56 transforms the start image $I_0$ in step S113, so as to coincide with the end image $I_N$. In FIG. 7, the transforming unit 56 transforms the start image $I_0$ so as to coincide with the end image $I_N$ on the basis of the transformation vector $T(I_0, I_N)$, in which those transformation vectors are integrated.

The transforming unit 56 outputs the start image I0 transformed so as to coincide with the end image $I_N$ and transformation vector information to the display processing unit 58. As illustrated in FIG. 7, the display processing unit 58 displays the transformed start image $I_0$ and the transformation vector information into the image display area of the displaying unit 36.

According to the embodiment, by calculating the conformity of the image from the image quality, similarity, and obtaining time of the image and detecting the position by using the images having a predetermined conformity, the position detecting precision can be improved. Thus, a precision adapted to transform the start image $I_0$ so as to coincide with the end image $I_N$ is improved. Although the transformation of the start image $I_0$ has been described in the embodiment, by improving the position detecting precision, a precision of a positional deviation correction and a precision of a tracking in a plurality of images also can be improved.

In this case, the image processing apparatus 10 has a positional deviation correcting unit for correcting positional deviations of the start image $I_0$ and the end image $I_N$ in such a manner that the corresponding position in the start image $I_0$ coincides with the corresponding position in the end image $I_N$. The image processing apparatus 10 also has a tracking unit for tracking, in the end image $I_N$, the corresponding position in the start image $I_0$.

Although the embodiment has been described above, the invention is not limited to those examples, but can be changed and modified in the scope recited in the claims.

(First Modification)

Although the example in which the combinations, each of which is constructed by the two images are selected as selection images, has been shown with reference to FIG. 4 in the foregoing embodiment, combinations, each of which is constructed by three or more images, may be selected as selection images. For example, it is assumed that the image data (moving images) obtained by the image obtaining unit 50 is constructed by the images $I_0$, $I_1$, $I_2$, $I_3$, and $I_4$. At this time, the start image $I_S=I_0$ and the end image $I_E=I_4$. In step S104 in the embodiment mentioned above, the image selecting unit 52 selects the combinations $(I_0, I_1)$, $(I_0, I_2)$, $(I_0, I_3)$, and $(I_0, I_4)$ each of which is constructed by the two images including the image $I_0$.

Now, assuming that combinations, each of which is constructed by three images are selection images, the image selecting unit 52 selects combinations $(I_0, I_1, I_2)$, $(I_0, I_1, I_3)$, $(I_0, I_1, I_4)$, $(I_0, I_2, I_3)$, $(I_0, I_2, I_4)$, and $(I_0, I_3, I_4)$, each of which is constructed by three images, including the image $I_0$. The conformity calculating unit 53 calculates, as a conformity, at least one of the image qualities of the three selection images and similarities among the three selection images.

For example, the conformity calculating unit 53 calculates similarities among the combinations $(I_0, I_1)$, $(I_0, I_3)$, and $(I_1, I_3)$, respectively, and calculates statistical values such as average values, minimum values, and the like, of them as a similarity S of the selection images $(I_0, I_1, I_3)$. That is, if three or more images are selected as selection images, the conformity calculating unit 53 calculates a conformity of the combination of the two images included in the selection images and calculates conformities (combination conformity) A of the selection images by using the statistic values of such conformities (at least one of the image qualities and similarities).

If the selection images $(I_0, I_1, I_3)$ have the maximum conformity A, the conformable image determining unit 54 determines, as a conformable image, the image $I_3$ whose time phase is the last. Since the conformable image $I_3$ is an image $I_{N-1}$ that is precedent to the end image $I_N=I_4$ by one time phase, the conformable image determining unit 54 outputs the conformable image $I_3$ to the detecting unit 55. The detecting unit 55 detects the corresponding positions in the start image $I_0$ and the conformable image $I_3$, and detects the corresponding positions in the conformable image $I_3$ and the end image $I_4$.

When the end image $I_N$ or the image $I_{N-1}$ is not included in the conformable images, the image selecting unit 52 selects a combination of a plurality of images, as selection images, from the images within a range from the conformable image to the end image $I_N$, and the conformable image determining unit 54 determines the next conformable image.

(Second Modification)

In the foregoing embodiment, by selecting the second image whose time phase is later than that of the first image, as a conformable image, the conformable images are sequentially determined. However, it is also possible to provide an arrangement such that combinations, each of which is constructed by a plurality of images, are selected as selection images, the conformity is calculated for every selected combination, and the conformable images are determined.

In the foregoing embodiment, after the conformable image was determined, the next conformable images are sequentially determined. Therefore, as illustrated in FIG. 6, the number of routes of the conformable images from the start image $I_0$ to the end image $I_N$ is equal to one (route: $I_0 \rightarrow I_2 \rightarrow I_7 \rightarrow I_N$). In the second modification, the number of routes of the conformable images from the start image $I_0$ to the end image $I_N$ is not limited to one, but may be a plural number.

The image selecting unit 52 selects combinations, each of which is constructed by a plurality of images as selection images. The conformity calculating unit 53 calculates the combination conformity A for every combination. The conformable image determining unit 54 determines a combination having a predetermined conformity as conformable images. The detecting unit 55 detects corresponding positions for every combination having a predetermined combination conformity A, and calculates transformation vectors of the corresponding positions. The detecting unit 55 determines a corresponding position in the end image $I_N$ by weighting the transformation vectors of the images within a range from the start image $I_0$ to the end image $I_N$. A weight coefficient is decided for every combination in accordance with the combination conformity A. The higher the combination conformity A, the greater is the weight coefficient.

The second modification will be described below with reference to FIGS. 8 to 10. A description about construction, functions, and operations similar to those in the foregoing embodiment is omitted here, and points different from the foregoing embodiment will be mainly described.

FIG. 8 is a flowchart illustrating an example of the operation of the second modification. In step S102, the start/end image setting unit 51 sets the start image $I_S=I_0$ and the end image $I_E=I_N$ among the plurality of images $I_0$, $I_1$, . . . , and $I_N$. In step S204, the image selecting unit 52 selects a combination of a plurality of images, as selection images, including the start image $I_0$ and the end image $I_N$ from the images $I_0$, $I_1$, . . . , and $I_N$ within a range from the start image $I_0$ and the end image $I_N$.

Figure 9A:
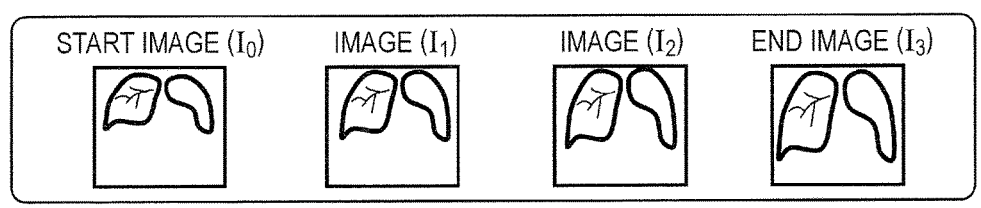
FIG. 9A is a diagram illustrating an example of a start image and an end image set by a start/end image setting unit.

FIG. 9A is a diagram illustrating an example of the start image $I_S$ and the end image $I_E$ set by the start/end image setting unit 51. As illustrated in FIG. 9A, the start/end image setting unit 51 sets the start image $I_S=I_0$ and the end image $I_E=I_3$.

Figure 9B:
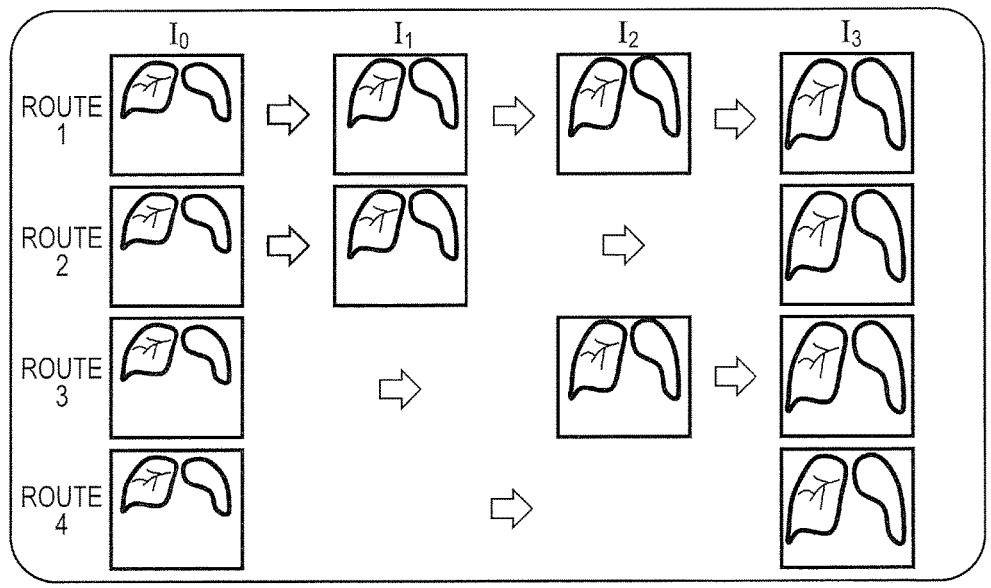
FIG. 9B is a diagram illustrating an example of a combination of a plurality of images selected by the image selecting unit.

FIG. 9B is a diagram illustrating an example of a combination of a plurality of images selected by the image selecting unit 52. As illustrated in FIG. 9B, the image selecting unit 52 selects, as selection images, all combinations $(I_0, I_1, I_2, I_3)$, $(I_0, I_1, I_3)$, $(I_0, I_2, I_3)$, and $(I_0, I_3)$ of a plurality of images including the start image $I_0$ and the end image $I_3$. Those combinations become routes of the selection images. In FIG. 9B, the routes of the selection images are the following four routes: route 1 $(I_0 \rightarrow I_1 \rightarrow I_2 \rightarrow I_3)$; route 2 $(I_0 \rightarrow I_1 \rightarrow I_3)$; Route 3 $(I_0 \rightarrow I_2 \rightarrow I_3)$; and route 4 $(I_0 \rightarrow I_3)$.

As illustrated in FIG. 9B, the total number F of combinations of a plurality of images, including the start image $I_0$ and the end image $I_N$, is expressed by the following equation (2).

$$F = 1 + \sum_{M=1}^{N-1} {}_{N-1}C_M \tag{2}$$

"N-1" indicates the number of images in which the start image $I_0$ and the end image $I_N$ are excluded from the images $I_0, I_1, \ldots,$ and $I_N$ and is a natural number. M is a natural number within a range from 1 to "N-1". In this instance, "$_{N-1}C_M$=(N-1)!/M!(N-M-1)!". When "N-1=0", since the combination $(I_0, I_N)$ is a unique combination, F=1.

In steps S105 and S106, the conformity calculating unit 53 calculates conformities with respect to the images included in the combination, and calculates the conformities of the combination, as a combination conformity A, on the basis of statistic values of the conformities. In the embodiment, the conformity calculating unit 53 calculates the conformities with respect to all of the routes of the total number F of combinations.

For example, with respect to the route 1 ($I_0 \rightarrow I_1 \rightarrow I_2 \rightarrow I_3$) in FIG. 9B, the conformity calculating unit 53 calculates the image qualities of the images $I_0$, $I_1$, $I_2$, and $I_3$ and calculates the statistic values such as average values, maximum values, and the like, of them as a combination image quality Q. The conformity calculating unit 53 calculates similarities of the two images $(I_0, I_1)$, $(I_1, I_2)$, and $(I_2, I_3)$ whose phases are neighboring and calculates the statistic values such as average values, maximum values, and the like, of them as a combination similarity S. The combination conformity A is defined by a function of the combination image quality Q($\alpha$, $\beta$) and the combination similarity S as mentioned above.

The conformity calculating unit 53 may calculate, as a conformity, a difference between the times (time phases) of the images included in the combination.

In step S207, the conformable image determining unit 54 determines a combination having the predetermined combination conformity A as conformable images and determines a route of the conformable images. The conformable image determining unit 54 may determine all of the combinations as conformable images, may determine a combination whose conformity A is maximum as conformable images, or may determine a plurality of combinations having the conformity A of a predetermined threshold value or more as conformable images. When a plurality of combinations are determined as conformable images, the conformable image determining unit 54 determines a route of the conformable images for every combination. For example, the route 1, route 2, and route 3 in FIG. 9B are determined as routes of the conformable images.

In step S110, the detecting unit 55 detects corresponding positions in the start image $I_0$, the conformable images, and the end image $I_N$ for every route (combination) of the conformable images. In step S111, the detecting unit 55 calculates a transformation vector of the corresponding position from the start image $I_0$ to the conformable image, transformation vectors among a plurality of conformable images, and a transformation vector from the conformable image to the end image $I_N$ for every route (combination) of the conformable images.

For example, in route 1 in FIG. 9B, the detecting unit 55 detects corresponding positions while time-sequentially tracing the start image $I_0$, the conformable images $I_1$ and $I_2$, and the end image $I_3$ and calculates transformation vectors. Since it is sufficient that a transformation vector $T(I_0, I_N)$ from the start image $I_0$ to the end image $I_N$ is calculated owing to the integration of the transformation vectors, another method may be applied to the calculation of the transformation vectors.

If there are a plurality of routes, in step S212, the detecting unit 55 determines a corresponding position in the end image $I_N$ by weighting a transformation vector $T(I_0, I_N, k)$ from the start image $I_0$ to the end image $I_N$. Character k denotes a route number added to the route (combination) of the conformable images. As for the weight coefficient, which is multiplied to each transformation vector (coordinate change), the higher the combination conformity A, the greater is the weight coefficient, and a sum of the weight coefficients is equal to one.

Figure 10:
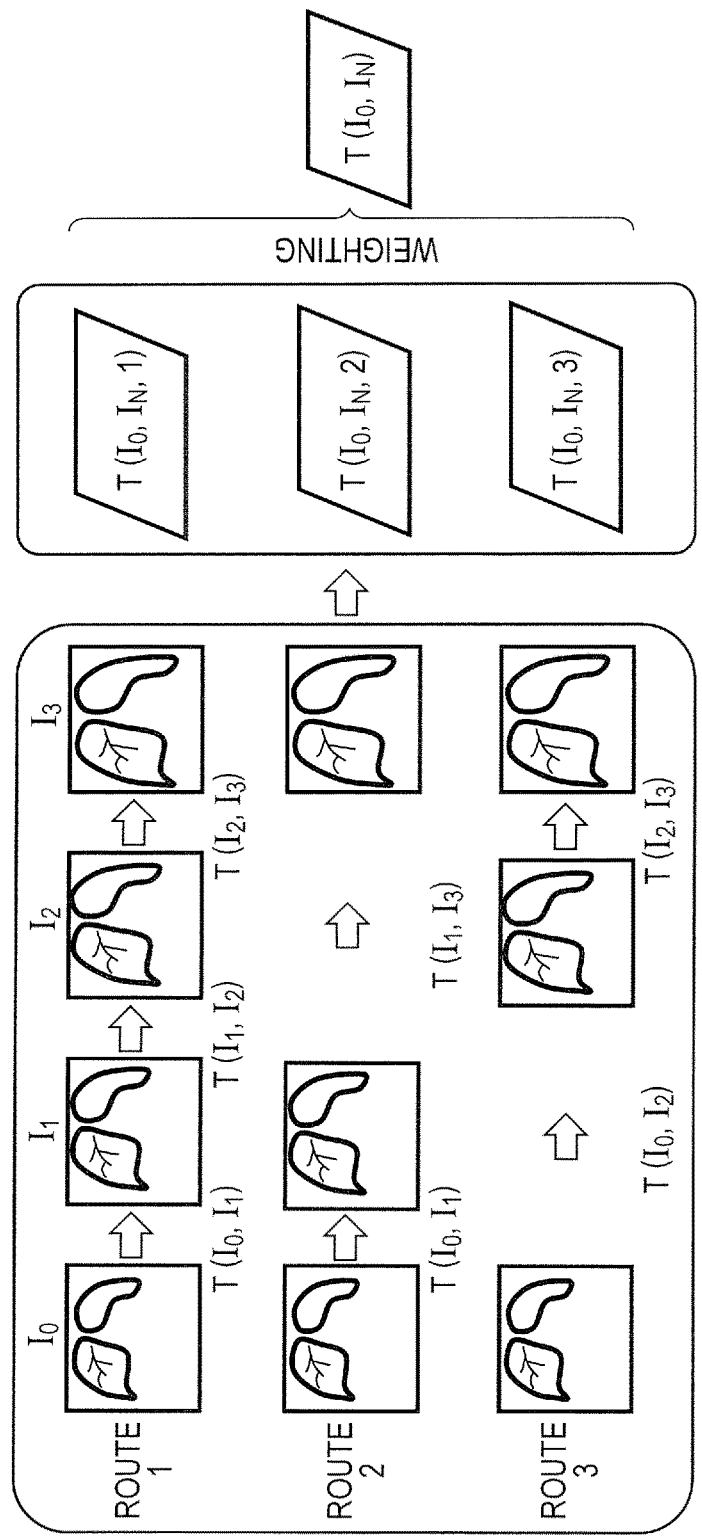
FIG. 10 is a diagram illustrating an example in which the detecting unit calculates a weight average of transformation vectors.

FIG. 10 is a diagram illustrating an example in which the detecting unit 55 calculates a weight average of the transformation vector $T(I_0, I_N, k)$. In FIG. 10, the conformable image determining unit 54 determines the route 1, route 2, and route 3 as routes of the conformable images.

The detecting unit 55 calculates a transformation vector of the corresponding position for every route (combination) of the conformable images and calculates a transformation vector $T(I_0, I_N, k)$ from the start image $I_0$ to the end image $I_N$ owing to the integration of the transformation vectors. For example, the detecting unit 55 calculates transformation vectors $T(I_0, I_1)$, $T(I_1, I_2)$, and $T(I_2, I_3)$ of the route 1 and calculates a transformation vector $T(I_0, I_N, 1)$ by integrating those transformation vectors. Similarly, the detecting unit 55 calculates transformation vectors $T(I_0, I_N, 2)$ and $T(I_0, I_N, 3)$.

As shown in the following equation (3), the detecting unit 55 calculates a transformation vector $Tp(I_0, I_N)$ as a weight average of a transformation vector $T_p(I_0, I_N, k)$ of each pixel p.

$$T_p(I_0, I_N) = \frac{1}{\sum_{k=1}^{K} w_k} \sum_{k=1}^{K} w_k \cdot T_p(I_0, I_N, k) \quad (3)$$

The route number k of the route of the conformable images is a natural number within a range from 1 to k. Character $w_k$ denotes a weight coefficient of the route (route No. k) of the conformable images. The weight coefficient $w_k$ may be a value that is proportional to the combination conformity A. The weight coefficient $w_k$ may be determined based on a value obtained by evaluating a transformation result (transformed image) of the start image $I_0$ for every combination. For example, the similarity S between the transformed image of the start image $I_0$ and the end image $I_N$ is calculated for every combination, and the weight coefficient $w_k$ is set in such a manner that the greater the similarity S, the greater the weight. The weight coefficient $w_k$ is set by using a difference between the pixel values (for example, intensity values, or the like) of the image or the similarity S by a community of the positions or distances of the feature portions.

In step S113, the transforming unit 56 transforms the start image $I_0$ on the basis of the transformation vector $T_p(I_0, I_N)$ so as to coincide with the end image $I_N$.

(Third Modification)

In the foregoing embodiment and the second modification, after the selection images were selected (steps S104, S204), the image quality Q is calculated. However, the calculation of the image qualities Q of the images $I_0$, $I_1, \ldots,$ and $I_N$ within a range from the start image $I_0$ to the end image $I_N$ may be performed before the selection of the selection images. Also, in this case, the conformity calculating unit 53 calculates image qualities of the selection images as conformities.

If the image quality Q of the start image $I_0$ (or, end image $I_N$) does not satisfy the predetermined image quality, the start/end image setting unit 51 may set an image of a time phase that is closest to the time phase of the start image $I_0$ (or, end image $I_N$), that is, an image that satisfies the predetermined image quality into the start image $I_S$ (or, end image $I_E$).

If the image quality Q of the image is equal to zero or is less than the predetermined threshold value, those images may be excluded from the selection images. In this case, the conformity calculating unit 53 may output nonconformity information of the image to the conformable image determining unit 54 without calculating the similarity S. By omitting the calculating process of the similarity S, a high processing speed is realized.

Other Embodiments

Embodiment(s) of the present invention can also be realized by a computer of a system or an apparatus that reads out and executes computer-executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   (A) an image obtaining unit configured to obtain a time-sequential image obtained in order of a start image, a plurality of intermediate images, and an end image; and
   (B) a route determining unit configured to determine a route that passes from the start image to the end image via at least one of the plurality of intermediate images for the time-sequential image, wherein the route determining unit includes:
   (a) an image selecting unit configured to select a plurality of first selection images from among the plurality of intermediate images;
   (b) a conformity calculating unit configured to calculate a first conformity based on image quality of the first selection image and a similarity between the start image and the first selection image, for each of the plurality of first selection images; and
   (c) a conformable image determining unit configured to determine a first conformable image from among the plurality of first selection images on the basis of the first conformity corresponding to each of the plurality of first section images.

2. The image processing apparatus according to claim 1, wherein the conformity calculating unit is configured to calculate the first conformity based on a difference between a time when the start image is obtained and a time when the first selection image is obtained, for each of the plurality of first selection images.

3. The image processing apparatus according to claim 1, wherein:
   the conformity calculating unit is configured to calculate statistical values of combinations of the first conformity corresponding to each of the plurality of first selection images, and calculates, as a combination conformity, a conformity of each of the combinations on the basis of statistical values of the conformities, and
   the conformable image determining unit determines the first conformable image on the basis of the combination conformity of each of the combinations.

4. The image processing apparatus according to claim 1, wherein the image quality includes image quality characteristics of at least one of a sharpness degree, a contrast, a blurring degree, a resolution, noises, and an artifact.

5. The image processing apparatus according to claim 1, wherein the conformity calculating unit is configured to calculate the similarity between a feature portion in the start image and a feature portion in the selection image.

6. The image processing apparatus according to claim 1, further comprising a transforming unit configured to transform at least one of the start image and the end image on the basis of transformation information between the time-sequential image along the route.

7. The image processing apparatus according to claim 1, wherein the image selecting unit is configured to select a plurality of second selection images from among the plurality of intermediate images obtained between the first conformable image and the end image,
   wherein the conformity calculating unit is configured to calculate a second conformity based on image quality of the second selection image and a similarity between the first conformably image and the second selection image, for each of the plurality of second selection images, and
   wherein the conformable image determining unit is configured to determine a second conformable image from among the plurality of second selection images on the basis of the second conformity corresponding to each of the plurality of second selection images.

8. The image processing apparatus according to claim 1, further comprising an image position matching unit configured to execute a position matching process for the time-sequential image along the route.

9. An image processing method comprising:
   obtaining a time-sequential image obtained in order of a start image, a plurality of intermediate images, and an end image;
   selecting a plurality of first selection images among the plurality of intermediate images;
   selecting a plurality of images, as selection images, among the images within a range from the start image and the end image;

calculating a first conformity based on image quality of the first selection images and between the start image and the first selection image, for each of the plurality of first selection images;

determining a first conformable image from among the plurality of first selection images on the basis of the first conformity and corresponding to each of the plurality of first selection images; and determining a route that passes from the start image to the end image via the first conformable image, for the time-sequential image.

10. The image processing method according to claim 9, further comprising:

selecting a plurality of second selection images among the plurality of intermediate images obtained between the first conformable image and the end image;

calculating a second conformity based on image quality of the second selection image and a similarity between the first conformable image and the second selection image, for each of the plurality of second selection images; and determining a second conformable image from among the plurality of second selection images on the basis of the second conformity corresponding to each of the plurality of second selection images, wherein the route passes from the start image to the end image via the first conformable image and the second conformable image.

11. The image processing method according to claim 9, further comprising executing a position matching process for the time-sequential image along the route.

12. A non-transitory computer-readable storage medium storing a computer program for causing a computer to function as each unit of an image processing apparatus comprising:

(A) an image obtaining unit configured to obtain a time-sequential image obtained in order of a start image, a plurality of intermediate images, and an end image; and (B) a route determining unit configured to determine a route that passes from the start image to the end image via at least one of the plurality of intermediate images for the time-sequential image, wherein the route determining unit includes:

(a) an image selecting unit configured to select a plurality of first selection images from among the plurality of intermediate images;

(b) a conformity calculating unit configured to calculate a first conformity based on image quality of the first selection image and a similarity between the start image and the first selection image, for each of the plurality of first selection images; and (c) a conformable image determining unit configured to determine a first conformable image from among the plurality of first selection images on the basis of the first conformity corresponding to each of the plurality of first section images.

13. An image processing apparatus comprising:

an image obtaining unit configured to obtain a time-sequential image obtained in order of a start image, a plurality of intermediate images, and an end image;

an image selecting unit configured to select a plurality of selection images from among the plurality of intermediate images; and a conformable image determining unit configured to determine a conformable image from among the plurality of selection images based on image quality of the selection image and a similarity between the start image and the selection image, for each of the plurality of selection images.

14. The image processing apparatus according to claim 13, further comprising an image position matching unit configured to execute a position matching process for the start image, the conformable image, and the end image.

15. The image processing apparatus according to claim 13, further comprising:

a route determining unit configured to determine a route that passes from the start image to the end image via at least one of the plurality of intermediate images as the conformable image; and an image position matching unit configured to execute a position matching process for the start image, the conformable image, and the end image along the route.

16. The image processing apparatus according to claim 13, wherein the image quality includes image quality characteristics of at least one of a sharpness degree, a contrast, a blurring degree, a resolution, noises, and an artifact.

17. The image processing apparatus according to claim 13, wherein the image selecting unit is configured to select the plurality of selection images as a plurality of first selection images and to select a plurality of second selection images from among the plurality of intermediate images obtained between the first conformable image and the end image, and wherein the conformable image determining unit is configured to determine the conformable image as a first conformable image and to determine a second conformable image from among the plurality of second selection images based on image quality of the second selection image and a similarity between the first conformably image and the second selection image, for each of the plurality of second selection images.

18. The image processing apparatus according to claim 17, further comprising an image position matching unit configured to execute a position matching process for the start image, the first conformable image, the second conformable image, and the end image.

* * * * *